United States Patent
Wei

(10) Patent No.: US 10,213,733 B2
(45) Date of Patent: Feb. 26, 2019

(54) GAS DENITRATION PROCESS AND APPARATUS

(71) Applicant: Beijing Boyuan Hengsheng High-Technology Co., Ltd, Beijing (CN)

(72) Inventor: Xionghui Wei, Beijing (CN)

(73) Assignee: BEIJING BOYUAN HENGSHENG HIGH-TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/560,134

(22) PCT Filed: Mar. 9, 2016

(86) PCT No.: PCT/CN2016/075917
§ 371 (c)(1),
(2) Date: Sep. 20, 2017

(87) PCT Pub. No.: WO2016/150301
PCT Pub. Date: Sep. 29, 2016

(65) Prior Publication Data
US 2018/0099245 A1    Apr. 12, 2018

(30) Foreign Application Priority Data

Mar. 20, 2015  (CN) .......................... 2015 1 0124581

(51) Int. Cl.
*B01D 53/14* (2006.01)
*B01D 53/56* (2006.01)
(Continued)

(52) U.S. Cl.
CPC ..... *B01D 53/1487* (2013.01); *B01D 53/1462* (2013.01); *B01D 53/56* (2013.01);
(Continued)

(58) Field of Classification Search
CPC ........ B01D 53/56; B01D 53/78; B01D 53/96; B01D 2251/104; B01D 2252/10;
(Continued)

(56) References Cited

U.S. PATENT DOCUMENTS 3,382,033 A * 5/1968 Kitagawa ............... B01D 53/56
423/239.1
4,024,219 A   5/1977 Takahashi et al.
(Continued)

FOREIGN PATENT DOCUMENTS

CN    1768902 A    5/2006
CN    101036851 A  9/2007
(Continued)

OTHER PUBLICATIONS

Korean Patent Office, Office Action for application No. KR 10-2017-7026509, dated Sep. 27, 2018.
(Continued)

*Primary Examiner* — Timothy C Vanoy
(74) *Attorney, Agent, or Firm* — Novick, Kim & Lee, PLLC; Allen Xue

(57) ABSTRACT

A process and an apparatus for gas denitration, involving first the use of an oxidizing agent to oxidize NO in a gas to $NO_2$, then using a denitration agent to absorb the $NO_2$ in the gas, thus achieving the purpose of denitration.

22 Claims, 2 Drawing Sheets

(51) Int. Cl.
*B01D 53/78* (2006.01)
*B01D 53/96* (2006.01)

(52) U.S. Cl.
CPC ............ *B01D 53/565* (2013.01); *B01D 53/78* (2013.01); *B01D 53/96* (2013.01); *B01D 2251/10* (2013.01); *B01D 2251/102* (2013.01); *B01D 2251/104* (2013.01); *B01D 2251/106* (2013.01); *B01D 2251/30* (2013.01); *B01D 2251/40* (2013.01); *B01D 2252/10* (2013.01); *B01D 2252/204* (2013.01); *B01D 2252/2026* (2013.01); *B01D 2252/602* (2013.01); *B01D 2255/2025* (2013.01); *B01D 2257/404* (2013.01); *B01D 2258/0283* (2013.01); *Y02A 50/2345* (2018.01)

(58) Field of Classification Search
CPC ........ B01D 2252/2026; B01D 2251/10; B01D 2251/102; B01D 2251/106; B01D 2251/30; B01D 2251/40; B01D 2252/602; B01D 2257/404; B01D 2258/0283; Y02A 50/2345

See application file for complete search history.

(56) References Cited

U.S. PATENT DOCUMENTS

| | | | | |
|---|---|---|---|---|
| 4,118,460 A | * | 10/1978 | Bolme | B01D 53/56 423/235 |
| 5,047,219 A | * | 9/1991 | Epperly | B01D 53/56 423/235 |
| 5,639,434 A | * | 6/1997 | Patrikainen | B01D 53/56 423/235 |
| 5,648,053 A | * | 7/1997 | Mimura | B01D 53/1406 423/210 |
| 6,146,604 A | | 11/2000 | Kiiskila et al. | |
| 6,759,022 B2 | * | 7/2004 | Hammer | B01D 53/1456 423/235 |
| 2003/0228246 A1 | * | 12/2003 | Hammer | B01D 53/1456 423/235 |
| 2004/0062698 A1 | | 4/2004 | Flynn et al. | |
| 2005/0214187 A1 | | 9/2005 | Johnson | |
| 2013/0259786 A1 | * | 10/2013 | Boos | B01D 53/56 423/235 |
| 2018/0043302 A1 | * | 2/2018 | Wei | B01D 53/50 |

FOREIGN PATENT DOCUMENTS

| | | |
|---|---|---|
| CN | 101053747 A | 10/2007 |
| CN | 101352645 A | 1/2009 |
| CN | 103495340 A | 1/2014 |
| CN | 103611391 A | 3/2014 |
| CN | 103623689 A | 3/2014 |
| CN | 103949145 A | 7/2014 |
| CN | 105214457 A | 1/2016 |
| JP | S49064560 A | 6/1974 |
| JP | 51-20780 A | 2/1976 |
| JP | H03275126 A | 5/1991 |
| JP | H08168638 A | 7/1996 |

OTHER PUBLICATIONS

Japanese Patent Office, Office Action for JP Patent Application No. 2017548019, dated Nov. 27, 2018.

* cited by examiner

GAS DENITRATION PROCESS AND APPARATUS

TECHNICAL FIELD

The present invention relates to the industrial field of gas denitration, and particularly to a process and an apparatus for the denitration of flue gases or various combustion exhaust (waste) gases.

BACKGROUND ART

With the development of national economy, energy consumption increases rapidly. A large quantity of flue gases is produced by combustion of lots of fossil fuels and discharged into atmosphere, wherein besides sulfur dioxide, sulfur trioxide, hydrogen chloride, hydrogen fluoride, nitrogen oxides and a small quantity of harmful organic substances, a large quantity of dusts is contained, and there are tiny hydrophilic and non-hydrophilic particles in these dusts (mainly calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles, and phosphate particles). These particles are discharged together with the flue gases into atmosphere, and at the same time, sulfur dioxide, sulfur trioxide, hydrogen chloride, hydrogen fluoride, nitrogen oxides, harmful organic substances, bacteria, and the like are readily adsorbed on the surface of these particles, thus the content of atmospheric suspended particles (which are generally referred to as PM100, PM10, PM2.5, etc.) is increased significantly, resulting in the phenomena of haze and atmospheric photochemical reactions, and causing more and more serious environmental pollution. The atmospheric smoke, acid rain, greenhouse effect and the destruction of ozone layer have become four killers endangering human survival.

Among them, harmful substances such as smoke, sulfur dioxide, nitrogen oxides or the like are the main reasons for air pollution, acid rain and greenhouse effect. In recent years, the management of nitrogen oxides ($NO_X$, including a variety of compounds, such as $N_2O$, $NO$, $NO_2$, $N_2O_3$, $N_2O$, $N_2O_5$ or the like) has become one of the focuses of attention by people. Under conditions of high temperature combustion, $NO_X$ is mainly present in the form of NO, and NO constitutes about 95% of the initially discharged $NO_X$. However, atmospheric NO reacts very easily with oxygen in the air to produce $NO_X$, thus atmospheric $NO_X$ is generally present in the form of NO. In the air, NO and $NO_2$ undergo mutual conversion by photochemical reactions to achieve equilibrium. At higher temperatures or in the presence of clouds and mists, $NO_2$ further interacts with water molecules to form the second important acid component in the acid rain, that is nitric acid ($HNO_3$), and in the presence of a catalyst, such as under appropriate meteorological conditions, the conversion of $NO_2$ to nitric acid is accelerated. Especially when $NO_2$ and $SO_2$ are present simultaneously, they can catalyze each other, and the formation of nitric acid is even faster. In addition, $NO_X$ may also accumulate gradually due to the waste gases discharged into stratosphere by aircrafts, such that its concentration increases, then at this point NO reacts with $O_3$ within the stratosphere to produce $NO_2$ and $O_2$, and $NO_2$ further reacts with $O_2$ to produce NO and $O_2$, thus $O_3$ equilibrium is broken, and the concentration of $O_3$ is reduced, resulting in the loss of $O_3$ layer. Research data shows that, if the management of nitrogen oxides in flue gases is still not enhanced, both the total amount of nitrogen oxides and the proportion thereof in the atmospheric pollutants will rise, and nitrogen oxides may replace sulfur dioxide as the main pollutants in atmosphere.

China is one of the few countries in the world that takes coal as the main source of energy. According to statistics, 67% of China's nitrogen oxides ($NO_X$) emissions are from coal combustion. According to statistics of State Environmental Protection Administration, in 2005 and 2010, coal consumption in China's thermal power plants accounted for 56% and 64% respectively of the total coal consumption in China, and $NO_X$ production by thermal power plants accounted for 50% of the total production in China. In view of the contribution of coal consumption to $NO_X$ emissions, the control of $NO_X$ emissions in thermal power plants is a key factor to control the total $NO_X$ emissions in China. With the promulgation and implementation of China's latest "Air Pollutants Emission Control Standards for Thermal Power Plants" and "Air Pollution Prevention and Control Law" as well as the formal entry into force of "Kyoto Protocol", the control of $NO_X$ emissions in China will become increasingly stringent, and it is imperative to take effective measures for controlling $NO_X$ emissions in thermal power plants. At present, the desulfurization and denitration processes of flue gases are independent of each other, denitration is usually carried out first and followed by desulfurization.

Now the denitration process used in the actual production mainly contains selective catalytic reduction (SCR) or selective non-catalytic reduction (SNCR).

In selective catalytic reduction (SCR), a catalytic bed or system is utilized to process a flue gas stream, wherein ammonia or urea is injected into the flue gas and mixed, then the gas is passed through the catalyst layer, and $NO_X$ is selectively converted (reduced) to $N_2$ and $H_2O$. SCR method is currently the most proven denitration technology with highest denitration efficiency. The first demonstration project of the SCR system was established in Shimoneski power plant in Japan in 1975, afterwards the SCR technology was widely applied in Japan. In Europe, there have been successful application experiences from more than 120 large-scale devices, and the $NO_X$ removal rate can reach 80% to 90%. So far, there are approximately 170 sets of device in Japan, power plants with a capacity of close to 100 GW have installed such apparatus, and US government also uses the SCR technology as the main technology for the main power plants to control $NO_X$. It is reported that the SCR method has currently become a relatively proven mainstream technology for denitration in power plants at home and abroad.

The principle of flue gas denitration by SCR method is as follows: under the catalysis of catalyst with $TiO_2$ and $V_2O_5$ as the main components and at a temperature of 280 to 400° C., or under the catalysis of catalyst with $TiO_2$, $V_2O_5$ and MnO as the main components and at a temperature of higher than 180° C., ammonia is sprayed into the flue gas, and NO and $NO_2$ are reduced to $N_2$ and $H_2O$, to achieve the purpose of denitration.

The SNCR denitration technology is a selective non-catalytic reduction technology without the use of catalysts, wherein at a temperature in the range of 850 to 1100° C., an amino-containing reducing agent (such as aqueous ammonia, urea solution, etc.) is sprayed into a furnace, and NO and $NO_2$ in the flue gas are reduced to $N_2$ and $H_2O$, thus the purpose of denitration is achieved. However, $NO_X$ removal rate of the industrial SNCR system is only 30-70%.

Both in SCR and SNCR denitration processes, ammonia consumption is relatively large, as the flue gas contains about 4% to 9% $O_2$, ammonia gas or amino-containing urea will react with $O_2$ to produce $NO_X$, ammonia is thus consumed, meanwhile ammonia reacts incompletely, some ammonia is discharged into atmosphere together with the flue gas, and the loss of ammonia increases, resulting in the phenomenon of secondary pollution. Lots of fossil fuels are consumed during ammonia production, and a large quantity of waste gases, waste dregs and waste water is produced, which is a severe process of environmental pollution, thus the use of ammonia should be avoided as far as possible.

There are also some drawbacks in the existing methods for removing NO from flue gases by SCR and SNCR. For the NO removal methods with ammonia as the reducing agent, ammonia, urea or aqueous urea solution is generally used as the source of the reducing agent. Excessive injection of ammonia or urea will lead to the so-called ammonia penetration, and the discharged ammonia is even more harmful than the discharged $NO_X$. The oxidation of excessive ammonia may lead to the formation of $NO_X$, and the transportation and storage of ammonia reducing agent have high requirements for safety and environmental protection. In addition, the catalyst used in the process of denitration will suffer from impingement and abrasion by high-concentration smoke and contamination by impurities in fly ashes. Excessively high temperature of flue gas will lead to catalyst sintering and deactivation, and the presence of $SO_2$ will lead to a rapid decline in catalyst activity.

Many researchers at home and abroad propose to use ozone for simultaneously oxidizing $SO_2$ and NO in a flue gas to $SO_3$ and $NO_2$, and then lime/limestone, sodium hydroxide, etc. are used for absorption, thus achieving the effect of simultaneous removal of $SO_2$ and NO. However, since ozone-generating device is very expensive, a great investment is required; and ozone production cost is very high, that for the oxidation of 1 mole of $SO_2$ to $SO_3$ or of 1 mole of NO to $NO_2$, the ozone consumption required is 1.5 to 3 moles, respectively, while for producing 1 kg of ozone, about 10 kWh of electricity and 10 to 20 kg of pure oxygen are to be consumed, respectively; the energy consumption is large, the expenditure is high, and the investment is great, making the large-scale industrialization of flue gas desulfurization and denitration by ozone unachievable currently. CN101352645A discloses a denitration process by catalytic oxidation, wherein the catalyst uses $TiO_2$ or $ZrO_2$—$TiO_2$ as the carrier and Co as the active component. NO is oxidized to water-soluble $NO_2$ by the oxygen contained in the flue gas itself, and then an alkaline solution is used for absorption and nitrogen oxides are thus removed.

CN1768902A discloses a boiler flue gas denitration method, wherein ozone $O_3$ is sprayed into a low-temperature section in a temperature range of 110-150° C. of the boiler flue, and nitric oxide NO in the boiler flue gas is oxidized to water-soluble nitrogen oxides of high valences, such as $NO_2$, $NO_3$ or $N_2O_5$; the molar ratio of the sprayed ozone $O_3$ to NO in the boiler flue gas is 0.5 to 1.5, and then the nitrogen oxides in the flue gas are removed by washing with an alkaline aqueous solution. However, in actual use, this technology has relatively low denitration efficiency and very high ozone consumption. To meet emission standards, its operating cost is particularly high, and enterprises cannot afford it, so large-scale industrialization of this technology has always been unachievable.

The patent application no. 201410245417.4 discloses a process and an apparatus for simultaneous desulfurization and denitration of a flue gas, wherein $SO_2$ and NO in the flue gas can be removed at the same time. However, upon further research and evaluation, it is found that, although the desulfurization efficiency of the process is greater than 99% and the content of $SO_2$ in the flue gas can be reduced to below 30 mg/$Nm^3$, yet the denitration efficiency is as low as about 40%-80%, and the regenerated gas released by regeneration is a mixed gas composed of $CO_2$, $SO_2$ and NO, later separation and disposal of which are relatively difficult due to the process complexity, waste recycling is troublesome, and it is inconvenient to turn wastes into valuables.

There are still a variety of problems in the above denitration embodiments, and there has been no denitration method in prior art which can effectively remove NO from waste gases and be used for industrial production.

SUMMARY OF INVENTION

Since $NO_X$ in a gas that has been subjected to dedusting and desulfurization is only present in the form of NO, and NO cannot be absorbed by any alkaline solution, it is impossible to effectively remove NO component in the gas with a solution of any alkaline substances. However, after NO is oxidized to $NO_2$ by an oxidizing agent, $NO_2$ in the gas can then be removed effectively by a solution of any alkaline substances.

The present invention describes a process and an apparatus for gas denitration, wherein NO in a gas is first oxidized to $NO_2$ by an oxidizing agent, and then $NO_2$ in the gas is absorbed by an absorbent to achieve the purpose of denitration.

The present invention provides a process for removing $NO_X$ (x=1 and/or 2) from a mixed gas, comprising the following steps:

a. Oxidation step: NO in the mixed gas is oxidized by an oxidizing agent to produce $NO_2$;

b. Denitration step: after oxidation, a $NO_2$-containing mixed gas is subjected to absorption by a denitration agent, whereby $NO_2$ therein is removed, and a $NO_2$-enriched denitration agent (referred to as "rich liquid") and a $NO_2$-removed mixed gas are obtained.

c. Denitration agent recycling step: the rich liquid is treated to obtain a denitration agent containing less $NO_2$ (referred to as "lean liquid"), which is recycled back to step b.

The mixed gases of the present invention may be untreated or treated flue gases, incinerated gases, coke-oven gases, synthesis waste gases from dyestuff plants, effluent gases from chemical fiber plants, as well as other industrial feed gases or waste gases containing $NO_X$. By "treated" means being subjected to dedusting and/or SOx removal. In a further embodiment, the oxidizing agent used in the oxidation step a is selected from one or more of free radical oxygen, organic acid anhydride, permanganic acid, permanganate, (per)tungstic acid, (per)tungstate, (per)titanic acid, (per)titanate, (per)molybdic acid, (per)molybdate, dichromic acid, dichromate, hydrogen peroxide, ferric acid, ferrate, and the like; in order to further improve the oxidation efficiency, a composite oxidizing agent can also be used, which is formed from $O_2$ and/or $O_3$ respectively with one or more of organic acid anhydride, permanganic acid, permanganate, (per)tungstic acid, (per)tungstate, (per)titanic acid, (per)titanate, (per)molybdic acid, (per)molybdate, dichromic acid, dichromate, hydrogen peroxide, ferric acid, ferrate, gold, silver, palladium, and the like.

Said oxidation process is as follows:

The first step: an oxidizing agent containing free radical oxygen is provided by all of the oxidizing agents, the greater the concentration of free radical oxygen is, the higher the oxidizability is, and the more thorough oxidation is. Free radical oxygen is represented by [O];

The second step: the following oxidation reaction takes place $$NO+[O] \rightarrow NO_2$$

Preferably, the oxidation step of the present application further comprises a step of preparing an oxidizing agent such as $O_2$, $O_3$ or free radical oxygen[O], a step of mixing the oxidizing agent with the $NO_X$-containing gas, and a step of catalytic oxidation.

In a further embodiment, the denitration process of step b may be carried out in a denitration tower under atmospheric or pressurized conditions. Preferably, the $NO_2$-containing gas enters the denitration tower from the bottom thereof, the denitration agent enters the denitration tower from the upper part thereof, and the $NO_2$-containing gas contacts with the denitration agent countercurrently in the denitration tower. The $NO_2$-removed gas comes out from the top of the denitration tower, the denitration agent that has absorbed $NO_2$ from the gas is converted to the $NO_2$-enriched denitration agent (hereinafter referred to as "rich liquid"), the "rich liquid" flows out from the bottom of the denitration tower, and goes to the next step of processing or recycling. In another embodiment, step b may also be carried out in such a way that both the gas and the denitration agent enter from the top of the denitration tower, and cocurrent absorption takes place in the denitration tower, thus the denitration step is completed. The $NO_2$-removed gas discharged from the denitration tower can be emitted directly into atmosphere, or it can be passed to other procedures for further processing.

The denitration agent in step b is selected from the following two types: the denitration agent of the first type is a solution containing an inorganic alkaline substance and/or an organic alkaline substance; the denitration agent of the second type is a polyethylene glycol solution and/or an ethylene glycol solution, and preferably, the polyethylene glycol solution and/or ethylene glycol solution contains a denitration additive.

Said denitration agent of the first type is preferably a solution containing alkali (earth) metal or transition metal hydroxide, carbonate, carboxylate, complex, ammonia, and/or organic amine, preferably a hydroxide or carbonate solution containing Li, Na, K, Mg or Ca. The cations in all of these substances are represented by $M^{n+}$, and in an absorption tower, the following absorption reaction takes place between the solutions of these substances and $NO_2$ in the gas:

$$M^{n+}+nNO_2+nH_2O \rightarrow M(NO_3)_n+2nH^+$$

At this point, the $NO_2$-enriched denitration agent is a solution containing $M(NO_3)_n$, which is concentrated, cooled and crystallized to obtain a product of $M(NO_3)_n$, where n is a positive integer. In the denitration agents of the second type, said denitration agent is a solution composed of ethylene glycol and/or polyethylene glycol and/or water, and a denitration additive is added to the solution in order to increase the denitration ability of the denitration agent; the amount of the denitration additive is 0.5-40% by weight, preferably 2-30% by weight, more preferably 5-25% by weight, and most preferably 10-20% by weight.

Said denitration additive is a kind (type) of organic compound (R-M) which is formed by mixing a polyol, a polyacid and an organic amine according to a certain proportion, then heating to above 120° C., and carrying out esterification and/or etherification, wherein the proportion is such that the molar ratio of the polyol:the polyacid:the organic amine is 1:0.5-2:0.1-3, preferably 1:0.7-1.5:0.3-2, more preferably 1:0.9-1.3:0.5-1.5, very preferably 1:0.9-1.1: 0.5-1.2, and most preferably 1:1:0.5-1.

Said polyol is an organic compound containing two or more hydroxyl groups at the same time in the same organic molecule, preferably ethylene glycol, propylene glycol, glycerol, butanediol, butanetriol, isobutanediol, isobutanetriol, pentanediol, pentanetriol, pentanetetraol, isopentanediol, isopentanetriol, isopentanetetraol, polyethylene glycol, polypropanol and polybutanol.

Said polyacid is an organic compound containing two or more carboxylic acid groups in the same molecule, preferably ethanedioic acid, propanedioic acid, butanedioic acid, aminoethanedioic acid, nitrilotriacetic acid, EDTA, tannin acid, polygallic acid, citric acid, and the like.

Said organic amine is selected from aliphatic amines, aromatic amines and alkylol amines. Said aliphatic amine is selected from methylamine, dimethylamine, trimethylamine, monoethylamine, diethylamine, triethylamine, monopropylamine, dipropylamine, tripropylamine, n-propylamine, isopropylamine, monobutylamine, dibutylamine, tributylamine, n-butylamine, sec-butylamine, isobutyl amine, t-butylamine, ethylenediamine, propylenediamine, hexamethylenediamine, triethylenediamine, diethylenetriamine, triethylenetetramine, tetraethylenepentamine, polyethylenepolyamine, cyclopentylamine, cyclohexylamine, cycloheptylamine; the aromatic amine is selected from aniline, N-methylaniline, N-ethylaniline, N-propyl aniline, N-butylaniline, N,N-dimethylaniline, N,N-diethylaniline, N,N-dipropylaniline, N,N-dibutyl aniline, phenylenediamine, α-naphthylamine, halogenated aniline, nitroaniline, sulfoaniline; the alkylol amine is selected from monomethanolamine, dimethanolamine, trimethanolamine, monoethanolamine, diethanolamine, triethanolamine, N,N-dimethylethanolamine, N,N-diethyl ethanolamine, N,N-diisopropyl ethanol amine, N-methyldethanolamine (MDEA), monopropanolamine, dipropanolamine, tripropanolamine, isopropanolamine, diisopropanolamine, triisopropanolamine, monobutanolamine, dibutanolamine, tributanolamine, N-hydroxyethyl ethylenediamine, N,N'-dihydroxyethylethylenediamine, N,N-dihydroxyethylaniline, N-ethyl-N-hydroxyethylaniline, N-methyl-N-hydroxyethylaniline, o-aminophenol, m-aminophenol, p-aminophenol, 2,4,6-tris (dimethylaminomethyl)phenol, 3-diethylaminophenol, 2-amino-5-nitrophenol, ammonia cefotaxime acid, N-methylpyrrolidinol, 2,4-diamino-6-hydroxypyrimidine, cyanuric acid, 2-(2'-hydroxy-5'-methyl phenyl)benzotriazole, gamma acid, J acid, phenyl J acid, Chicago acid and its salts, H acid and its salts, di-J acid, scarlet acid and its salts, and the like.

In addition, the denitration agent of the second type may also be a composite solvent used for $SO_2$ removal as disclosed in CN103611391 and CN103495340.

In order to describe the fundamental principles of the present invention more clearly, taking only an ethylene glycol solution containing a denitration additive (R-M) as an example, the denitration mechanism and principle of the denitration agent of the second type are illustrated below. However, it is not intended that the denitration solution of the present invention is limited to be composed only of ethylene glycol and denitration additive (R-M); instead, it is a denitration solution composed of water and/or ethylene glycol and/or polyethylene glycol and denitration additive (R-M) (hereinafter referred to as "denitration liquid").

In the absorption tower, when the denitration liquid contacts with the gas, the following absorption reaction takes place:

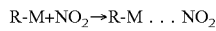

For the denitration liquid with absorbed $NO_2$, the following desorption reaction takes place in a regeneration tower:

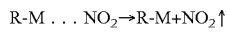

The regenerated denitration liquid is recycled for use.

The gas denitration processes of the present invention include: simple oxidation gas denitration process and oxidation gas denitration regeneration process.

Said simple oxidation gas denitration process employs a denitration agent of the first type, and includes key processes such as oxidation, denitration, concentrative crystallization of solution, recycling of mother liquid, and the like, as shown in FIG. 1.

Said oxidation gas denitration regeneration process employs a denitration agent of the second type, and includes key processes such as oxidation, denitration, regeneration and recycling of denitration liquid, $NO_2$ concentrating, and the like, as shown in FIG. 2.

In embodiments where a denitration agent of the first type is used, the concentrative crystallization of solution is a process in which the solution with absorbed $NO_2$ (rich liquid) is evaporated by an evaporator, cooled by a cooler and crystallized in a crystallizer to obtain a product of $M(NO_3)_n$. After crystallization, the mother liquid can be recycled back for use in the denitration tower, preferably supplemented with the denitration agent of the first type to form the lean liquid, and then recycled back to step b).

In embodiments where a denitration agent of the second type is used as the denitration agent, the rich liquid flows through a regeneration device, the resulting lean liquid is recycled back to step b; wherein the regeneration device is preferably a regeneration tower, and wherein the regeneration method used is selected from one or a combination of more than one of gas stripping method, heating method, vacuumizing method, ultrasonic method, microwave method and radiation method. In the gas stripping method, the rich liquid enters the gas stripping regeneration tower, an inert gas (such as nitrogen, carbon dioxide, argon, water vapor, etc.) is introduced from the bottom of the gas stripping regeneration tower and brings $NO_2$ out; the resulting lean liquid can be recycled back directly to step b for repeated use, or it can also be sent to other regeneration procedures for further regeneration, and then sent to step b for repeated use.

In the heating method, the rich liquid enters a heating regenerator, $NO_2$ is released by heating, and the lean liquid is formed.

In the vacuumizing method, the rich liquid enters a vacuum regenerator, $NO_2$ is released under a vacuum condition, and the lean liquid is formed.

In the ultrasonic method, microwave method and radiation method, the rich liquid enters an ultrasonic regenerator, a microwave regenerator or a radiation regenerator, $NO_2$ is released under the irradiation of ultrasonic wave, microwave or radiation wave, and the lean liquid is formed.

In a further preferred embodiment, said regeneration step is as follows: the denitration liquid with absorbed $NO_2$ from the denitration process, which is referred to as "rich liquid", goes through indirect heat exchange (usually through a tube type heat exchanger) with the $NO_2$-released denitration liquid flowing out from the bottom of the regeneration tower (hereinafter referred to as "lean liquid"), then is heated to above 70° C., and then enters from the upper end of the regeneration tower. In the regeneration tower, the rich liquid is in sufficient countercurrent contact with the hot stripping gas coming from the bottom (preferably an inert gas such as nitrogen, argon or water vapor and the like, the temperature of which is higher than the saturated vapor temperature of water corresponding to the pressure in the regeneration tower), the $NO_2$ dissolved in the rich liquid is desorbed, and is mixed with the stripping gas to form a mixed gas. The mixed gas is discharged from the top of the regeneration tower and sent to the concentrating process for concentrating treatment; The regenerated rich liquid is turned into the lean liquid, flows out from the bottom of the regeneration tower, is cooled to below 50° C. by heat exchange, and then is sent to the denitration process for recycle use. In the above steps, heating and gas stripping are used to regenerate the denitration liquid, hence the name, gas stripping-heating denitration liquid regeneration tower (or denitration liquid regenerator), which is a binary regenerator. In order to improve the regeneration effect, a vacuum pump is used for vacuumizing to create a certain vacuum degree in the denitration liquid regeneration tower, while the denitration liquid is regenerated by three ways of gas stripping, heating and vacuumizing at the same time, hence the name, gas stripping-heating-vacuumizing denitration liquid regeneration tower (or denitration liquid regenerator), which is a ternary regenerator. And so forth, in order to further improve the regeneration effect, an ultrasonic regeneration system and/or a microwave regeneration system and/or a radiation regeneration system may also be installed in the denitration liquid regeneration tower (or denitration liquid regenerator), forming a multi-denitration liquid regeneration tower (or denitration liquid regenerator) by gas stripping, heating, vacuumizing and ultrasonic wave and/or microwave and/or radiation, and the like, which is a multi-regenerator.

In embodiments where a denitration agent of the second type is used as the denitration agent, the present invention further comprises a $NO_2$ concentrating step:

d) $NO_2$ concentrating step: it is a process in which the released $NO_2$ is concentrated to a $NO_2$ gas product with a relatively high purity through a concentration tower.

In a preferred embodiment of the present invention, said concentrating step is carried out in the concentration tower. The regenerated gas containing $NO_2$ enters the concentration tower from the middle part thereof and is cooled by a cooling device at the upper part of the concentration tower; then $NO_2$ gas is discharged from the top of the concentration tower, the cooled condensed water is discharged from the bottom of the concentration tower.

In a further preferred embodiment, $NO_2$ gas released by the regeneration process of the rich denitration liquid enters from the middle part of the concentration tower, and contacts countercurrently with the water condensed from the top of the concentration tower, such that the water vapor in the mixed gas is condensed; the water vapor-removed mixed gas flows out from the top of the concentration tower, the gas mainly contains $NO_2$ component, and also contains a small amount of such components as sulfur dioxide, carbon dioxide or the like at the same time, wherein $NO_2$ can be used as a raw material for nitric acid, and the remaining gases can be returned to the denitration process and then vented; the water vapor enters from the bottom end of the concentration tower, and contacts countercurrently with the condensed water; harmful components such as the residual $NO_2$ and the like are extracted by the water vapor to achieve the effect of concentrating $NO_2$, while the harmful components such as $NO_2$ and the like are removed from the condensed water to turn the condensed water into distilled water, which flows out from the bottom of the concentration tower, and is recycled to the boiler water.

Further, the present invention also provides a device for removing $NO_X$ (x=1 and/or 2) from a mixed gas.

Where in embodiments where a denitration agent of the first type is used, said device includes an $O_3$ or free radical oxygen[O] generator, a gas mixer, a catalytic oxidizer, a denitration tower, a solvent tank and an evaporative crystallizer, wherein one end of the gas mixer is provided with a mixed gas inlet, pipelines connect between the generator and the mixer, between the mixer and the catalytic oxidizer, between the catalytic oxidizer and the denitration tower, between the denitration tower and the solvent tank, and between the solvent tank and the evaporative crystallizer, characterized in that the pipeline between the denitration tower and the solvent tank is equipped with a diverter valve which introduces part of the $NO_2$-enriched denitration agent into the evaporative crystallizer.

Further, in embodiments where a denitration agent of the second type is used, said device includes an $O_3$ or free radical oxygen[O] generator, a gas mixer, a catalytic oxidizer, a denitration tower, a regeneration tower and a concentration tower, wherein one end of the gas mixer is provided with a mixed gas inlet, pipelines connect between the generator and the mixer, between the mixer and the catalytic oxidizer, between the catalytic oxidizer and the denitration tower, between the denitration tower and the regeneration tower, and between the regeneration tower and the concentration tower, characterized in that the lean liquid is recycled from a lean liquid outlet at the bottom of the regeneration tower back to a denitration agent inlet at the upper part of the denitration tower through the pipeline.

In a preferred embodiment of the present invention, a lean liquid tank is provided between the regeneration tower and the denitration tower, the lean liquid discharged from the bottom of the regeneration tower enters the lean liquid tank and flows out from the bottom of the lean liquid tank, and flows into the denitration agent inlet at the upper part of the denitration tower through the pipeline.

In another preferred embodiment of the present invention, one or more heat exchangers are provided between the denitration tower and the regeneration tower and/or between the regeneration tower and the lean liquid tank. Preferably, the heat exchanger between the denitration tower and the regeneration tower, and the heat exchanger between the regeneration tower and the lean liquid tank, are the same indirect heat exchanger, wherein the heat medium is the lean liquid discharged from the regeneration tower, and the cold medium is the rich liquid discharged from the denitration tower. Throughout the present application, there may be no clear mention of the presence of ordinary but important elements, such as pumps, valves and heat exchangers; However, unless explicitly mentioned, such omissions should not be construed as the absence of these elements. The above mentioned devices are defined as follows:

$O_3$ or free radical oxygen [O] generator: a device for converting pure oxygen to $O_3$ or free radical oxygen[O];

Mixer: a device for sufficiently and uniformly mixing $O_3$ or free radical oxygen [O] gas with the NO-containing gas;

Catalytic oxidizer: a device filled with a solid catalyst or a solid oxidizing agent, such that the NO-containing gas reacts with $O_2$ or $O_3$ or free radical oxygen[O] sufficiently to produce $NO_2$;

Absorption tower: a device for the gas to be in direct contact with the denitration lean liquid, whereby the denitration lean liquid absorbs $NO_2$ in the gas and becomes the denitration rich liquid, which then is discharged from the absorption tower;

Regeneration tower: a device for desorbing $NO_2$ from the denitration rich liquid by ways of heating and/or gas stripping and/or vacuumizing regeneration, whereby the denitration rich liquid becomes the denitration lean liquid, and the denitration lean liquid obtained by regeneration is again sent back to the absorption tower for recycle use.

Concentration tower: a device for removing water vapor in the $NO_2$ gas released by regeneration of the denitration rich liquid in the regeneration tower by condensation, whereby $NO_2$ is concentrated to a $NO_2$ gas product with a relatively high purity.

Compared with the conventional SCR and SNCR, the present invention has the following advantages: (1) when the conventional SCR and SNCR processes are used for flue gas denitration, ammonia or urea is used to convert $NO_X$ in the gas to $N_2$ and $H_2O$ at high temperatures (for SNCR, the temperature is above 850° C., and for SCR, the temperature is above 350° C., with the action of a catalyst) to achieve the purpose of denitration; however, this method has a large ammonia consumption and severe ammonia escape, resulting in the phenomenon of secondary pollution. For the gas denitration process and apparatus of the present invention, there is no phenomenon of secondary pollution, and the by-products are nitrate products of high purity, these by-products are important chemical raw materials with wide market prospects and important application values. (2) For the conventional SCR and SNCR method, ammonia is used as the denitration agent, whereas the production of ammonia itself is a process of heavy pollution and high energy consumption, which is inflammable and explosive. For the gas denitration process and apparatus of the present invention, a catalytic oxidation denitration process at room temperature is employed, safe and environmentally friendly oxidizing agents and catalysts are used without any phenomenon of secondary pollution. (3) For the gas denitration process by the conventional SCR and SNCR method, in actual applications, the effects are better at the beginning, but after a period of time, the effects of denitration decrease significantly, and the $NO_X$ content in the gas increases rapidly. For the gas denitration process and apparatus of the present invention, the purifying degree of denitration is high, and the $NO_X$ content in the gas can be reduced stably to below 30 $mg/m^3$, while the operating cost is low, the process is short, the investment is small, and the operation is simple.

The present invention has the following beneficial effects:

The gas denitration process and apparatus of the present invention have broad industrial applications, and can be used for denitration of flue gases, incinerated gases, coke-oven gases, synthesis waste gases from dyestuff plants, effluent gases from chemical fiber plants, as well as other industrial feed gases or waste gases containing $NO_X$. The $NO_X$ contents in the above gases are less than 99.9% by volume.

1. In an embodiment of the present invention, NO in the gas is specifically converted to $NO_2$, and then an alkaline substance is used to absorb $NO_2$ in the gas, thus the $NO_X$ content in the gas can be reduced to below 30 $mg/Nm^3$, and meanwhile, the alkaline substance with absorbed $NO_2$ is converted to a nitrate, which is subjected to evaporation, crystallization and drying to obtain an industrial grade nitrate product.

2. In another embodiment of the present invention, NO in the gas is specifically converted to $NO_2$, and then a solution containing a denitration agent is used to absorb $NO_2$ in the gas; after that, the solution which contains the denitration agent and has absorbed $NO_2$ in the gas is regenerated to release $NO_2$ gas of high purity (the gas purity is greater than 98%, and it can be used as a raw material for producing concentrated nitric acid). After regeneration, the solution containing the denitration agent is cooled and then recycled for repeated use; thus treated, $NO_X$ content in the gas can be reduced to below 30 mg/Nm$^3$.

DESCRIPTION OF DRAWINGS

In FIG. 1: 1 represents a NO-containing gas, 2 represents a denitrated gas, 3 represents an $O_2$ gas, 4 represents an $O_3$ or free radical oxygen[O] generator, 5 represents an $O_2$ or $O_3$ or free radical oxygen[O] or a mixture thereof, 6 represents a mixer, 7 represents a catalytic oxidizer, 8 represents a denitration tower, 9 represents a lean liquid, 10 represents a rich liquid, 11 represents a solution tank, 12 represents a denitration pump, 13 represents a rich liquid to be concentrated, 14 represents an evaporative-concentrating crystallizer, 15 represents a concentrated mother liquid, 16 represents a M($NO_3$)$_n$ product precipitated by crystallization, and 17 represents an inorganic or organic alkaline substance.

In FIG. 2: 1 represents a NO-containing gas, 2 represents a denitrated gas, 3 represents an $O_2$ gas, 4 represents an $O_3$ or free radical oxygen[O] generator, 5 represents an $O_2$ or $O_3$ or free radical oxygen[O] or a mixture thereof, 6 represents a mixer, 7 represents a catalytic oxidizer, 8 represents a denitration tower, 9 represents a lean liquid, 10 represents a rich liquid, 12 represents a denitration pump, 18 represents a rich liquid pump, 19 represents a lean liquid tank, 20 represents a cooler, 21 represents a heat exchanger, 22 represents a regeneration tower, 23 represents a heater, 24 represents a $NO_2$ concentration tower, 25 represents a condenser, 26 represents a mixed gas of $NO_2$ and steam, 27 represents a steam, 28 represents a condensed distilled water, 29 represents a cooling water, 30 represents a cooling water that is heated, and 31 represents a $NO_2$ gas of high concentration.

DETAILED DESCRIPTION

The gas denitration process and apparatus according to the present invention will be described below in conjunction with specific embodiments. The embodiments are intended to better illustrate the present invention, and should not be construed as limiting the claims of the present invention.

Figure 1:
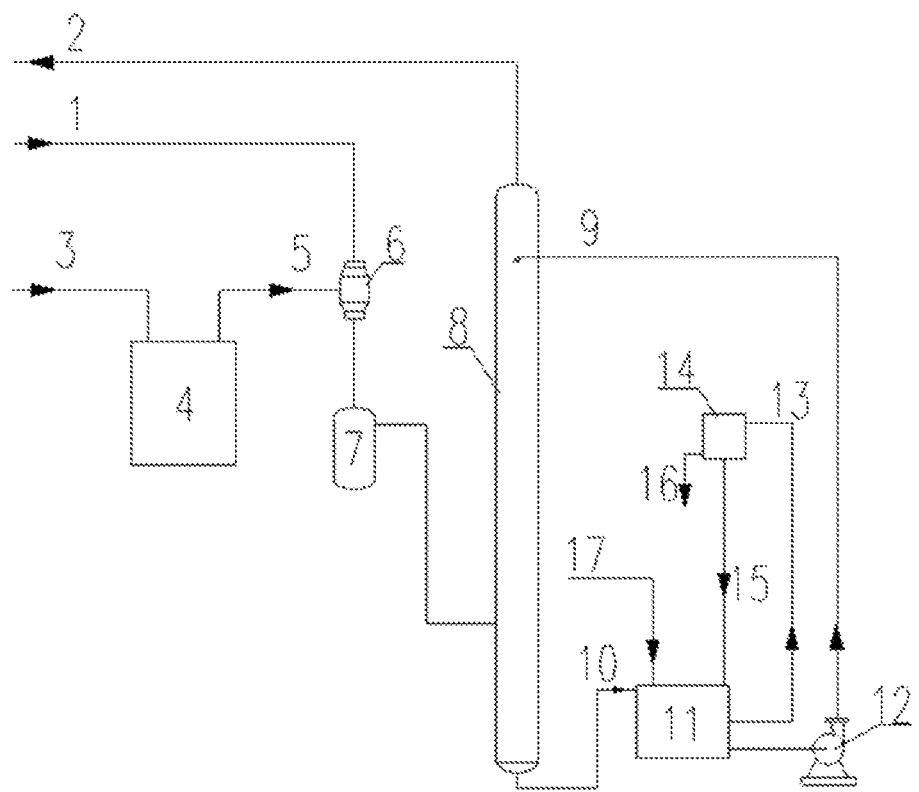
FIG. 1 is a schematic diagram showing the simple oxidation gas denitration process and apparatus.

The process of using the denitration agent of the first type and the operation method of the apparatus are shown in FIG. 1: $O_2$ gas 3 enters a $O_3$ or free radical oxygen [O] generator 4, and in the $O_3$ or free radical oxygen [O] generator 4, $O_2$ or $O_3$ or free radical oxygen [O] or a mixture thereof 5 is produced; the $O_2$ or $O_3$ or free radical oxygen [O] or the mixture thereof 5 enters a mixer 6 to mix thoroughly with the mainstream of a NO-containing gas 1 in the mixer 6, and then enters a catalytic oxidizer 7. In the catalytic oxidizer 7, NO in the NO-containing gas 1 is catalytically oxidized to $NO_2$ gas, and the NO-containing gas 1 is converted to a $NO_2$-containing gas; the $NO_2$-containing gas enters a denitration tower 8 from the bottom, and meanwhile, a solution containing denitration agent (lean liquid) 9 enters the denitration tower 8 from the top. In the denitration tower 8, the $NO_2$-containing gas is in direct contact with the lean liquid 9; at this point, $NO_2$ in the $NO_2$-containing gas is absorbed by the lean liquid 9, the $NO_2$-containing gas is converted to a denitrated gas 2, which flows out from the top of the denitration tower 8, and is discharged into atmosphere or subjected to further purification treatment. At the same time, the lean liquid 9 with absorbed $NO_2$ is converted to a rich liquid 10, flows out from the bottom of the denitration tower 8 and enters a solution tank 11. Part of the rich liquid 13 in the solution tank 11 enters an evaporative-concentrating crystallizer 14, and a M($NO_3$)$_n$ product 16 precipitated by crystallization is obtained; the remaining concentrated mother liquid 15 is returned to the solution tank 11, and the solution tank 11 is replenished with a fresh inorganic alkaline substance or organic alkaline substance 17. Then the rich liquid 10 is converted to the lean liquid 9, and is sent by a denitration pump 12 to the denitration tower 8 to absorb the $NO_2$ component in the $NO_2$-containing gas.

Figure 2:
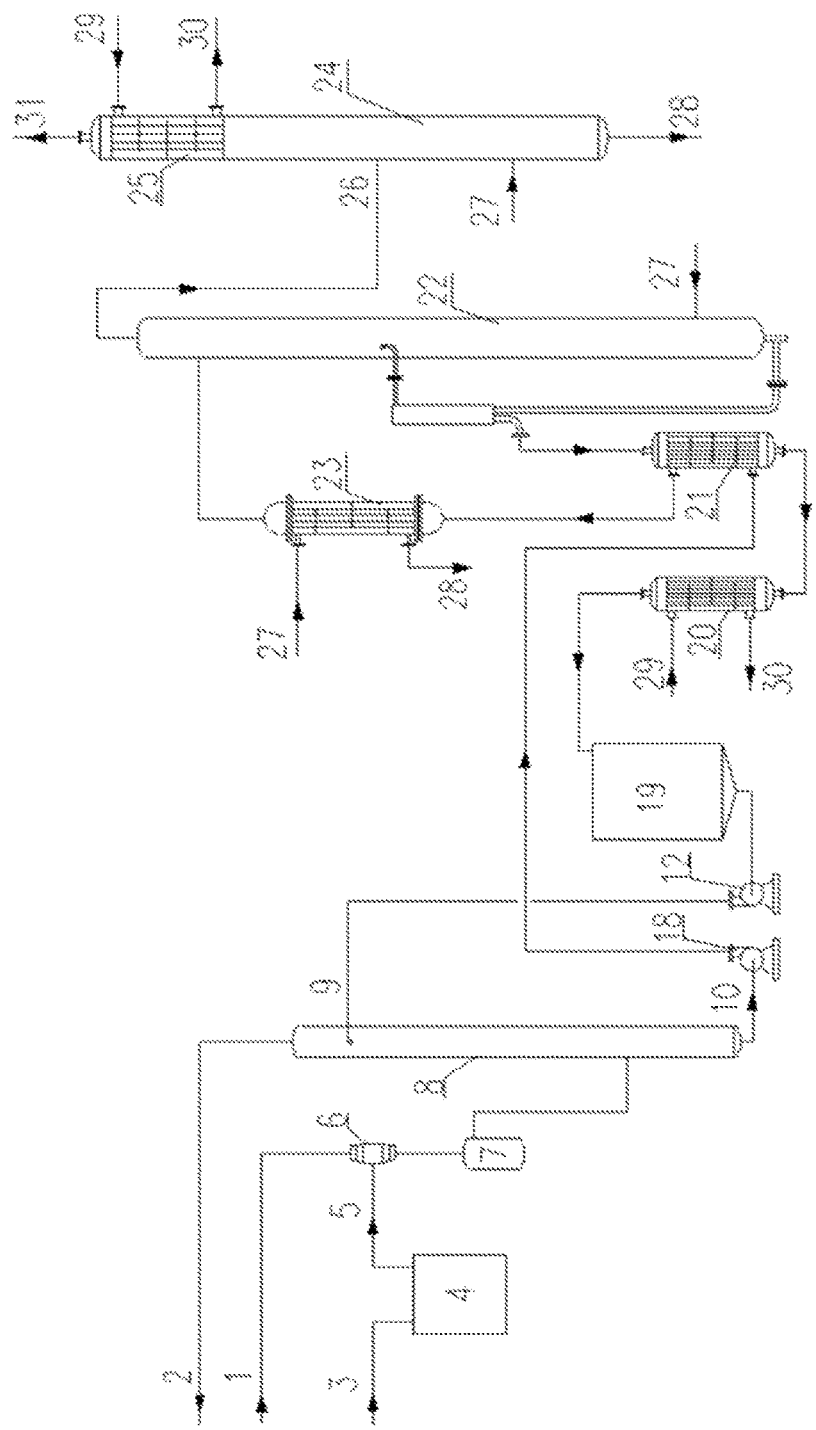
FIG. 2 is a schematic diagram showing the oxidation gas denitration and regeneration process and apparatus.

The process of using the denitration agent of the second type and the operation method of the apparatus are shown in FIG. 2: $O_2$ gas 3 enters a $O_3$ or free radical oxygen [O] generator 4, and in the $O_3$ or free radical oxygen [O] generator 4, $O_2$ or $O_3$ or free radical oxygen [O] or a mixture thereof 5 is produced; the $O_2$ or $O_3$ or free radical oxygen [O] or the mixture thereof 5 enters a mixer 6 to mix thoroughly with the mainstream of a NO-containing gas 1 in the mixer 6, and then enters a catalytic oxidizer 7. In the catalytic oxidizer 7, NO in the NO-containing gas 1 is catalytically oxidized to $NO_2$ gas, the $NO_2$-containing gas enters a denitration tower 8 from the bottom, and meanwhile, a lean liquid 9 enters the denitration tower 8 from the top. In the denitration tower 8, the $NO_2$-containing gas is in direct contact with the lean liquid 9; at this point, $NO_2$ is absorbed by the lean liquid 9, the $NO_2$-containing gas is converted to a denitrated gas 2, which flows out from the top of the denitration tower 8, and is discharged into atmosphere or subjected to further purification treatment. At the same time, the lean liquid 9 with absorbed $NO_2$ is converted to a rich liquid 10, and the rich liquid 10 is pressurized by a rich liquid pump 18, then is heat-exchanged with the hot lean liquid 9 from a regeneration tower 22 through the shell pass of a heat exchanger 21, thus the temperature rises; then it passes through a rich liquid heater 23 and is heated by a steam 27 (the heated steam may be replaced by a liquid having a temperature higher than 100° C. or a flue gas of 130 to 170° C.) to above 70° C.; the rich liquid 10 having a temperature higher than 70° C. enters the regeneration tower 22 from the upper end, while the stripping steam 27 enters the regeneration tower 22 from the bottom; in the regeneration tower 22, the rich liquid 10 having a temperature higher than 70° C. is in direct contact with the stripping steam 27; at this point, $NO_2$ in the rich liquid 10 is desorbed, and is mixed into the stripping steam 27 to form a mixed gas 26 of $NO_2$ and stream, which flows out from the top of the regeneration tower 22; at this point, the rich liquid 10 is converted to the hot lean liquid 9 having a temperature higher than 70° C., and flows out from the bottom of the regeneration tower 22; it passes through the tube pass of the heat exchanger 21 and is heat-exchanged with the rich liquid 10 in the shell pass that is sent from the rich liquid pump 18, thus the temperature decreases; the lean liquid 9 having decreased temperature travels along the tube pass of a cooler 20 and is cooled to room temperature by a cooling water 29 of the shell pass, and automatically flows into a lean liquid tank 19, then the lean liquid 9 in the lean liquid tank 19 is pressurized by a denitration agent pump 12 and again sent to the denitration tower 8 for denitration. The denitration solution works in such a way that, in the denitration tower 8, the lean liquid 9 absorbs $NO_2$ and is converted to the rich liquid 10, and in the regeneration tower 22, the rich liquid 10 is heated, stripped and/or vacuum-regenerated, thus is again converted to the lean liquid 9, and the lean liquid 9 is again recycled for use, and it cycles continuously like this. The mixed gas 26 of $NO_2$ and steam flowing out from the top of the regeneration tower 22 enters a $NO_2$ concentration tower 24 from the middle part, and contacts with the distilled water condensed from the upper end of the $NO_2$ concentration tower 24; in a condenser 25, the water vapor in the mixed gas 26 is condensed by the cooling water 29, and a $NO_2$ gas 31 of high concentration that is not condensed and that contains a small amount of impurities flows out from the top of the condenser 25, and can be recycled as a feed gas; while the condensed distilled water containing substances such as $NO_2$ and the like continues to flow to the bottom of the $NO_2$ concentration tower 24, and contacts with the stripping steam 27 from the bottom; the gases such as $NO_2$ and the like in the distilled water are stripped by the stripping steam 27 and desorbed, so that the condensed water is substantially free of such gases as $NO_2$ and the like, and the condensed distilled water 28 meeting the standards of distilled water is sent for recycle use. In the whole process, the cooling water 29 is heated and converted to a heated cooling water 30, which can be recycled for use as a boiler replenishing hot water, and the condensed distilled water 28 can be recycled for use.

Example 1

According to the denitration process and apparatus shown in FIG. 1, a set of small size simulated industrial gas denitration device was made and installed. The forms of various devices in the apparatus are as follows:

NO-containing gas 1 was a prepared cylinder gas, with a NO content of 1000-5000 ppm;

$NO_X$ content in the denitrated gas 2 was analyzed by the ultraviolet JNYQ-I-41 type gas analyzer manufactured by Xi'an Juneng Instrument Co., Ltd;

$O_2$ gas 3 was a cylinder gas of pure oxygen;

$O_3$ or free radical oxygen [O] generator 4 was self designed and manufactured, with an ionization area of 180 mm×240 mm, a plate gap adjustment range of 0.1-2 mm, a frequency of high frequency power supply of 5.4 MHz, an output voltage of 0-3000V and an output power of 1 KW;

$O_2$ or $O_3$ or free radical oxygen [O] or a mixture thereof 5 was a mixed gas of free radical oxygen [O], $O_3$ and $O_2$.

Mixer 6 was a glass tube filled with wire packings;

Catalytic oxidizer 7 was a glass absorption bottle filled with a catalyst such as potassium permanganate or the like;

Denitration tower 8 was a glass absorption bottle, and lean liquid 9 denitration agent was a 15% NaOH aqueous solution;

$M(NO_3)_n$ product precipitated by crystallization 16 was $NaNO_3$.

The operation method of the above apparatus was as follows: the flow rate of the NO-containing gas 1 was adjusted to 1 L/hr and stabilized; NO concentration as shown by the ultraviolet JNYQ-I-41 type gas analyzer was read as 1013 ppm; the flow rate of $O_2$ gas 3 through the $O_3$ or free radical oxygen [O] generator 4 was adjusted, and after mixing in the mixer 6, the total flow rate was stabilized to be 1.2 L/hr (that is, the flow rate of $O_2$ was 0.2 L/hr); NO concentration read from that shown by the ultraviolet JNYQ-I-41 type gas analyzer was stabilized substantially between 780-830 ppm, and then the following tests were carried out:

1. When the $O_3$ or free radical oxygen [O] generator 4 was not powered, and $O_3$ or free radical oxygen [O] was not available, the mixed gas was first passed through the glass absorption bottle working as the catalytic oxidizer 7 (filled with potassium permanganate), and then passed through the glass absorption bottle working as the denitration tower 8 (filled with a 15% NaOH aqueous solution); NO concentration read from that shown by the ultraviolet JNYQ-I-41 type gas analyzer was stabilized substantially between 50-60 ppm, and the denitration efficiency was 92% to 95%.

2. When the $O_3$ or free radical oxygen [O] generator 4 was not powered, and the gas component supplied by the $O_3$ or free radical oxygen [O] generator 4 was $O_2$ with a concentration of 100%, the mixed gas was first passed through the glass absorption bottle working as the catalytic oxidizer 7 (but the glass absorption bottle was not filled with any catalyst), and then passed through the glass absorption bottle working as the denitration tower 8 (filled with a 15% NaOH aqueous solution); NO concentration read from that shown by the ultraviolet JNYQ-I-41 type gas analyzer was stabilized substantially between 850-950 ppm, and the denitration efficiency was 6% to 16%.

3. When the $O_3$ or free radical oxygen [O] generator 4 was powered, and when the gas components supplied by the $O_3$ or free radical oxygen [O] generator 4 were $O_3$ with a concentration of 10% and $O_2$ with a concentration of 90%, the mixed gas was first passed through the glass absorption bottle working as the catalytic oxidizer 7 (but the glass absorption bottle was not filled with any catalyst), and then passed through the glass absorption bottle working as the denitration tower 8 (filled with a 15% NaOH aqueous solution); NO concentration read from that as shown by the ultraviolet JNYQ-I-41 type gas analyzer wasstabilized substantially between 500-600 ppm, and the denitration efficiency was 40.8% to 51%.

4. When the $O_3$ or free radical oxygen [O] generator 4 was powered, and the gas components supplied by the $O_3$ or free radical oxygen [O] generator 4 were [O] with a concentration of 3% and $O_2$ with a concentration of 97%, the mixed gas was first passed through the glass absorption bottle working as the catalytic oxidizer 7 (but the glass absorption bottle was not filled with any catalyst), and then passed through the glass absorption bottle working as the denitration tower 8 (filled with a 15% NaOH aqueous solution); NO concentration read from that as shown by the ultraviolet JNYQ-I-41 type gas analyzer was stabilized substantially between 20-40 ppm, and the denitration efficiency was 96% to 98%.

5. When the $O_3$ or free radical oxygen [O] generator 4 was powered, and the gas components supplied by the $O_3$ or free radical oxygen [O] generator 4 were [O] with a concentration of 3% and $O_2$ with a concentration of 97%, the mixed gas was first passed through the glass absorption bottle working as the catalytic oxidizer 7 (the glass absorption bottle was filled with potassium permanganate), and then passed through the glass absorption bottle working as the denitration tower 8 (filled with a 15% NaOH aqueous solution); NO concentration read from that shown by the ultraviolet JNYQ-I-41 type gas analyzer was stabilized substantially between 0-5 ppm, and the denitration efficiency was 99.5% to 100%.

From the above tests, it can be seen that when free radical oxygen [O] and potassium permanganate are used for co-catalytic oxidation, the denitration effect is the best, and the denitration rate is 99.5%-100%; slightly inferior is the use of free radical oxygen [O] alone for oxidation, the denitration effect is slightly inferior, and the denitration rate is 96%-

98%; more inferior is the use of potassium permanganate alone for co-catalytic oxidation, the denitration effect is more inferior, and the denitration rate is 92% to 95%; even more inferior is the use of $O_3$ alone for oxidation, the denitration effect is even more inferior, and the denitration rate is 40.8%-51%; and when $O_2$ is used alone for oxidation, the effect is the most inferior, and the denitration rate is only 6%-16%.

Example 2

According to the process and apparatus shown in FIG. 2, a very simple denitration device was designed. With the device, the gas was allowed to pass directly through a glass absorption bottle filled with 100 mL denitration agent for absorption, and then the ultraviolet JNYQ-I-41 type gas analyzer was used to directly measure the concentration of NO in the outlet gas of the glass absorption bottle. To make the test more intuitive and simpler, a cylinder gas prepared from $N_2$ and $NO_2$ was used directly for the absorption test. The content of $NO_2$ in the test cylinder gas was 5000 ppm; In the test method, a depressuring valve of the cylinder gas was directly connected to the inlet of the glass absorption bottle, then the outlet of the glass absorption bottle was directly connected to the ultraviolet JNYQ-I-41 type gas analyzer, and the gas flow rate was adjusted to 1.5 L/hr. The gas was injected into the glass absorption bottle, and recording of the absorption time was started. When the $NO_2$ concentration displayed on the ultraviolet JNYQ-I-41 type gas analyzer was slowly increased from 0 to 1000 ppm, gas charging was stopped and gas charging time $T_1$ (min) was recorded. Then, the glass absorption bottle with absorbed $NO_2$ (filled with 100 mL denitration agent) was transferred to an oil bath heater for being heated (the temperature was 80° C.), regenerated by $N_2$ stripping for 30 min and cooled. And then absorption at the same flow rate was carried out and time $T_2$ was recorded. With the same method and under the same conditions, regeneration for 30 min, cooling and again absorption were carried out. In such a way, repeated absorption and repeated regeneration were carried out, and the recorded times $T_n$ were as follows: $T_1$ was 45 min, $T_2$ was 40 min, $T_3$ was 39 min, $T_4$ was 38 min, $T_5$ was 39 min, $T_6$ was 40 min, $T_7$ was 38 min, and $T_8$ was 38 min. After more than 30 times of absorption and regeneration, the absorption time was substantially stabilized around 26 min, indicating that the denitration agent (R-M) was stable and could be recycled for use. At the same time, that is, with such simple absorption-regeneration-absorption-regeneration . . . , which can proceed continuously, and with little change in the absorption capacity of the denitration agent, the oxidation gas denitration regeneration process and apparatus shown in FIG. 2 are sufficient to achieve the industrialization process of gas denitration and by-production of $NO_2$ products as well as the function of really turning wastes into valuables.

What is claimed is:

1. A process for removing NO from a mixed gas, comprising:
    a. oxidizing NO in the mixed gas using an oxidizing agent to produce $NO_2$;
    b. removing $NO_2$ in the mixed gas by absorption using a denitration agent to obtain a $NO_2$-enriched denitration agent and a $NO_2$-removed mixed gas; and
    c. treating the $NO_2$-enriched denitration agent to obtain a $NO_2$-lean denitration agent and using the $NO_2$-lean denitration agent as the dentritration agent in step b, and wherein said denitration agent is a hydroxide or carbonate solution containing Li, Na, K, Mg, Ca, or mixtures thereof.

2. The process according to claim 1, wherein the oxidizing agent in step a is one or more selected from the group consisting of free radical oxygen, $O_3$, $O_2$, organic acid anhydride, permanganic acid, permanganate, tungstic acid, pertungstic acid, tungstate, pertungstate, titanic acid, pertitanic acid, titanate, pertitanate, molybdic acid, permolybdic acid, molybdate, permolybdate, dichromic acid, dichromate, hydrogen peroxide, ferric acid, and ferrate.

3. The process according to claim 1, wherein the oxidizing agent in step a is a composite oxidizing agent, comprising one or more selected from the group consisting of free radical oxygen, $O_3$, $O_2$, organic acid anhydride, permanganic acid, permanganate, tungstic acid, pertungstic acid, tungstate, pertungstate, titanic acid, pertitanic acid, titanate, pertitanate, molybdic acid, permolybdic acid, molybdate, permolybdate, dichromic acid, dichromate, hydrogen peroxide, ferric acid, ferrate, gold, silver, and palladium.

4. The process according to claim 1, further comprising a step of preparing $O_3$ and/or free radical oxygen.

5. The process according to claim 1, wherein the step b is carried out in a denitration tower, and said $NO_2$-containing mixed gas contacts with the denitration agent countercurrently.

6. The process according to claim 1, wherein in the step c, a part of the $NO_2$-enriched denitration agent is evaporative-concentrated, cooled and crystallized to obtain a product of $M(NO_3)_n$, where n is a natural number; after crystallization, a mother liquid is supplemented with fresh denitration agent to form the $NO_2$-lean denitration agent.

7. The process according to claim 1, wherein the denitration agent in the step b is a polyethylene glycol solution, an ethylene glycol solution, or a mixture thereof.

8. The process according to claim 7, wherein the polyethylene glycol solution and/or ethylene glycol and/or aqueous solution further contains a denitration additive, said denitration additive is in an amount of 0.5-40 wt %; wherein the denitration additive is an organic compound which is formed by mixing a polyol, a polyacid and an organic amine according to a certain proportion, then heating to above 120° C., and carrying out esterification and/or etherification, wherein the proportion is such that the molar ratio of the polyol: the polyacid: the organic amine is 1:0.5-2:0.1-3.

9. The process according to claim 7, wherein in the step c, the $NO_2$-enriched denitration agent is regenerated in a regeneration tower using a regeneration method selected from one or more of gas stripping method, heating method, vacuumizing method, ultrasonic method, microwave method, and radiation method.

10. The process according to claim 9, further comprising:
    d. concentrating a $NO_2$-containing regenerated gas released from the regeneration tower in a concentration tower to obtain $NO_2$.

11. The process according to claim 10, wherein in the step d, the $NO_2$-containing regenerated gas enters the concentration tower at a middle part of the concentration tower, and is cooled by a cooling device at an upper part of the concentration tower, whereby $NO_2$ gas is discharged from a top of the concentration tower, and a cooled condensed water is discharged from a bottom of the concentration tower.

12. An apparatus for removing NO from a mixed gas, comprising: an $O_3$ or free radical oxygen [O] generator, a gas mixer, a catalytic oxidizer, a denitration tower, a solvent tank and an evaporative crystallizer, wherein one end of the gas mixer is provided with a mixed gas inlet, pipelines connect between said $O_3$ or free radical oxygen [O] generator and the gas mixer, between the gas mixer and the catalytic oxidizer, between the catalytic oxidizer and the denitration tower, between the denitration tower and the solvent tank, and between the solvent tank and the evaporative crystallizer, wherein the pipeline between said denitration tower and the solvent tank is equipped with a diverter valve which introduces part of the $NO_2$-enriched denitration agent into the evaporative crystallizer.

13. An apparatus for removing NO from a mixed gas, comprising: a gas mixer, a catalytic oxidizer, a denitration tower, a regeneration tower and a concentration tower, wherein one end of the gas mixer is provided with an inlet for the mixed gas and an oxidizing agent, pipelines connect between said gas mixer and the catalytic oxidizer, between the catalytic oxidizer and the denitration tower, between the denitration tower and the regeneration tower, and between the regeneration tower and the concentration tower, wherein a $NO_2$-lean denitration agent is recycled from a $NO_2$-lean denitration agent outlet at the bottom of the regeneration tower back to a denitration agent inlet at the upper part of the denitration tower through the pipeline.

14. The apparatus for removing NO from a mixed gas according to claim 13, wherein a lean liquid tank is provided between said regeneration tower and the denitration tower, the $NO_2$-lean denitration agent discharged from the bottom of the regeneration tower enters the lean liquid tank and flows out from the bottom of the lean liquid tank, and flows into the denitration agent inlet at the upper part of the denitration tower through the pipeline.

15. The apparatus for removing NO from a mixed gas according to claim 14, wherein indirect heat exchangers are provided between the denitration tower and the regeneration tower, between the regeneration tower and the lean liquid tank, wherein the heat medium is the $NO_2$-lean denitration agent discharged from the regeneration tower, and the cold medium is the $NO_2$-enriched denitration agent discharged from the denitration tower.

16. A denitration additive for removing $NO_2$ from a mixed gas, wherein said denitration additive is an organic compound which is formed by mixing a polyol, a polyacid and an organic amine in a certain proportion, then heating to above 120° C., and carrying out esterification and/or etherification, wherein the proportion is such that the molar ratio of the polyol: the polyacid: the organic amine is 1:0.5-2:0.1-3.

17. The denitration additive according to claim 16, wherein said polyol is an organic compound containing two or more hydroxyl groups at the same time in the same organic molecule.

18. The denitration additive according to claim 17, wherein said polyacid is an organic compound containing two or more carboxylic acid groups in the same molecule.

19. The denitration additive according to claim 16, wherein said polyol is selected from one or more of ethylene glycol, propylene glycol, glycerol, butanediol, butanetriol, isobutanediol, isobutanetriol, pentanediol, pentanetriol, pentanetetraol, isopentanediol, isopentanetriol, isopentanetetraol, polyethylene glycol, polypropanol and polybutanol.

20. The denitration additive according to claim 16, wherein said polyacid is an organic compound containing two or more carboxylic acid groups in the same molecule.

21. The denitration additive according to claim 16, wherein said polyacid is selected from one or more of ethanedioic acid, propanedioic acid, butanedioic acid, aminoethanedioic acid, nitrilotriacetic acid, EDTA, tannin acid, polygallic acid and citric acid.

22. The denitration additive according to claim 16, wherein said organic amine is selected from aliphatic amines, aromatic amines and alkylol amines, said aliphatic amine is selected from one or more of methylamine, dimethylamine, trimethylamine, monoethylamine, diethylamine, triethylamine, monopropylamine, dipropylamine, tripropylamine, n-propylamine, isopropylamine, monobutylamine, dibutylamine, tributylamine, n-butylamine, sec-butylamine, isobutylamine, t-butylamine, ethylenediamine, propylenediamine, hexamethylenediamine, triethylenediamine, diethylenetriamine, triethylenetetramine, tetraethylenepentamine, polyethylenepolyamine, cyclopentylamine, cyclohexylamine and cycloheptylamine; said aromatic amine is selected from one or more of aniline, N-methylaniline, N-ethylaniline, N-propylaniline, N-butylaniline, N,N-dimethylaniline, N,N-diethylaniline, N,N-dipropylaniline, N,N-dibutylaniline, phenylenediamine, α-naphthylamine, halogenated aniline, nitroaniline and sulfoaniline; said alkylol amine is selected from one or more of monomethanolamine, dimethanolamine, trimethanolamine, monoethanolamine, diethanolamine, triethanolamine, N,N-dimethylethanolamine, N,N-diethylethanolamine, N,N-diisopropylethanolamine, N-methyldiethanolamine (MDEA), monopropanolamine, dipropanolamine, tripropanolamine, isopropanolamine, diisopropanolamine, triisopropanolamine, monobutanolamine, dibutanolamine, tributanolamine, N-hydroxyethylethylenediamine, N,N'-dihydroxyethylethylenediamine, N,N-dihydroxyethylaniline, N-ethyl-N-hydroxyethylaniline, N-methyl-N-hydroxyethylaniline, o-aminophenol, m-aminophenol, p-aminophenol, 2,4,6-tris(dimethylaminomethyl)phenol, 3-diethylaminophenol, 2-amino-5-nitrophenol, ammonia cefotaxime acid, N-methylpyrrolidinol, 2,4-diamino-6-hydroxypyrimidine, cyanuric acid, 2-(2'-hydroxy-5'-methylphenyl)benzotriazole, gamma acid, J acid, phenyl J acid, Chicago acid and its salts, H acid and its salts, di-J acid, scarlet acid and its salts.

* * * * *